(12) United States Patent
Kennedy (10) Patent No.: US 8,104,086 B1
(45) Date of Patent: Jan. 24, 2012

(54) HEURISTICALLY DETECTING SPYWARE/ADWARE REGISTRY ACTIVITY

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1237 days.

(21) Appl. No.: 11/071,765

(22) Filed: Mar. 3, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl. ............... 726/22; 726/23; 726/24; 726/25; 713/187; 713/188; 713/164; 713/190; 713/167; 713/2; 709/216; 709/217; 709/203; 709/246

(58) Field of Classification Search ............ 726/24
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,473,760 A | 12/1995 | Horiuchi | |
| 5,473,769 A | 12/1995 | Cozza | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,889,943 A | 3/1999 | Ji et al. | |
| 5,951,698 A | 9/1999 | Chen et al. | |
| 5,956,481 A | 9/1999 | Walsh et al. | |
| 5,960,170 A | 9/1999 | Chen et al. | |
| 5,978,917 A | 11/1999 | Chi | |
| 5,987,610 A | 11/1999 | Franczek et al. | |
| 6,070,244 A | 5/2000 | Orchier et al. | |
| 6,072,830 A | 6/2000 | Proctor et al. | |
| 6,088,803 A | 7/2000 | Tso et al. | |
| 6,094,731 A | 7/2000 | Waldin et al. | |

(Continued)

FOREIGN PATENT DOCUMENTS

DE    100 21 686 A1    11/2001

(Continued)

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

(Continued)

*Primary Examiner* — Nathan Flynn
*Assistant Examiner* — Bryan Wright
(74) *Attorney, Agent, or Firm* — Fenwick & West LLP (57) ABSTRACT

Methods, apparati, and computer-readable media for detecting the presence of malicious computer code in a computer. In a method embodiment, persistence points in an operating system of the computer are examined (31). When a pointer to a temporary directory is found (32) at a persistence point, a declaration is made (34) of a suspicion of malicious code being present in the computer. Second and third method embodiments are used when the computer has a native operating system (14) controlling hardware (11) functions and a user-interface operating system (12) built on top of the native operating system (14). A fourth method embodiment is used when the computer has an operating system comprising a kernel (20) and a user interface (21).

17 Claims, 5 Drawing Sheets

U.S. PATENT DOCUMENTS

| | | | |
|---|---|---|---|
| 6,104,872 A | 8/2000 | Kubota et al. | |
| 6,108,799 A | 8/2000 | Boulay et al. | |
| 6,192,379 B1 | 2/2001 | Bekenn | |
| 6,199,181 B1 | 3/2001 | Rechef et al. | |
| 6,275,938 B1 | 8/2001 | Bond | |
| 6,338,141 B1 | 1/2002 | Wells | |
| 6,357,008 B1 | 3/2002 | Nachenberg | |
| 6,370,648 B1 | 4/2002 | Diep | |
| 6,535,891 B1 | 3/2003 | Fisher et al. | |
| 6,552,814 B2 | 4/2003 | Okimoto et al. | |
| 6,611,925 B1 | 8/2003 | Spear | |
| 6,622,150 B1 | 9/2003 | Kouznetsov et al. | |
| 6,678,734 B1 | 1/2004 | Haatainen et al. | |
| 6,697,950 B1 | 2/2004 | Ko | |
| 6,721,721 B1 | 4/2004 | Bates et al. | |
| 6,748,534 B1 | 6/2004 | Gryaznov et al. | |
| 6,763,462 B1 | 7/2004 | Marsh | |
| 6,785,818 B1* | 8/2004 | Sobel et al. | 726/22 |
| 6,813,712 B1 | 11/2004 | Luke | |
| 6,851,057 B1 | 2/2005 | Nachenberg | |
| 6,910,134 B1 | 6/2005 | Maher et al. | |
| 2002/0004908 A1 | 1/2002 | Galea | |
| 2002/0026605 A1* | 2/2002 | Terry | 714/37 |
| 2002/0035696 A1 | 3/2002 | Thacker | |
| 2002/0046275 A1 | 4/2002 | Crosbie et al. | |
| 2002/0083175 A1 | 6/2002 | Afek et al. | |
| 2002/0091940 A1 | 7/2002 | Wellborn et al. | |
| 2002/0157008 A1 | 10/2002 | Radatti | |
| 2002/0162015 A1 | 10/2002 | Tang | |
| 2002/0178374 A1 | 11/2002 | Swimmer et al. | |
| 2003/0023865 A1 | 1/2003 | Cowie et al. | |
| 2003/0051026 A1 | 3/2003 | Carter et al. | |
| 2003/0065926 A1 | 4/2003 | Schultz et al. | |
| 2003/0115485 A1 | 6/2003 | Milliken | |
| 2003/0120951 A1 | 6/2003 | Gartside et al. | |
| 2003/0126449 A1 | 7/2003 | Kelly et al. | |
| 2003/0140049 A1 | 7/2003 | Radatti | |
| 2003/0159070 A1* | 8/2003 | Mayer et al. | 713/201 |
| 2003/0191966 A1 | 10/2003 | Gleichauf | |
| 2003/0212902 A1 | 11/2003 | van der Made | |
| 2003/0236995 A1 | 12/2003 | Fretwell | |
| 2004/0015726 A1 | 1/2004 | Szor | |
| 2004/0030913 A1 | 2/2004 | Liang et al. | |
| 2004/0158730 A1 | 8/2004 | Sarkar | |
| 2004/0162808 A1 | 8/2004 | Margolus et al. | |
| 2004/0181687 A1 | 9/2004 | Nachenberg et al. | |
| 2004/0225877 A1* | 11/2004 | Huang | 713/100 |
| 2005/0021740 A1 | 1/2005 | Bar et al. | |
| 2005/0044406 A1 | 2/2005 | Stute | |
| 2005/0132205 A1 | 6/2005 | Palliyil et al. | |
| 2005/0177736 A1 | 8/2005 | De los Santos et al. | |
| 2005/0204150 A1 | 9/2005 | Peikari | |
| 2006/0064755 A1 | 3/2006 | Azadet et al. | |
| 2006/0075501 A1* | 4/2006 | Thomas et al. | 726/24 |
| 2006/0265761 A1* | 11/2006 | Rochette et al. | 726/27 |

FOREIGN PATENT DOCUMENTS

| | | | |
|---|---|---|---|
| EP | 1 280 039 A | 1/2003 | |
| GB | 2 364 142 A | 1/2002 | |
| WO | WO 97/39399 A | 10/1997 | |
| WO | WO 01/91403 A | 11/2001 | |
| WO | WO 02/05072 A | 1/2002 | |

OTHER PUBLICATIONS

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet<URL:http://www.symantec.com/press/1999/n991001.html>. Author unknown.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME__sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>. U.S.A.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>, New Zealand.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Toth, et al "Connection-history based anomaly detection" Proceedings of the 2002 IEEE Workshop on Information Assurance and Security. West Point, NY, Jun. 17-19, 2002. pp. 30-35.

Symantec Corporation, "Norton AntiVirus Corporate Edition 7.0," Manual, 1999, Version 1, 44 pp, U.S.A.

Kephart, Jeffrey et al., "An Immune System for Cyberspace" IBM Thomas J. Watson Research Center, IEEE 1997, pp. 879-884.

Bakos et al., "Early Detection of Internet Work Activity by Metering ICMP Destination Unreachable Activity.", Proc. of SPIE Conference on Sensors, and Command, Control, Communications and Intelligence, Orlando, Apr. 2002.

\* cited by examiner

HEURISTICALLY DETECTING SPYWARE/ADWARE REGISTRY ACTIVITY

TECHNICAL FIELD

This invention pertains to the field of thwarting a category of malicious computer code known as spyware or adware.

BACKGROUND ART

Spyware/adware is a category of malicious computer code that is a growing nuisance and a threat to the privacy of computer users.

Spyware is software that persists itself in an unusual or an obnoxious way on the user's computer. The computer does not know that the spyware is present. The user did not give permission to the spyware to reside on the user's computer. The spyware may be difficult to uninstall, even manually. It tries to mask its presence as it extracts something from the user's computer. The item that is extracted might be relatively innocuous, such as a marketing preference, or something very important, such as the user's credit card number.

Adware may visibly display a pop-up ad on the user's computer, or it may simulate clicks from the user to obtain revenue for an advertiser. Adware can range from quasi-legitimate to deceitful.

Regardless of the particular definitions that are employed, this category of malicious computer code is an increasing menace and must be thwarted, while minimizing the rate of false-positive declarations of spyware/adware.

DISCLOSURE OF INVENTION

Methods, apparati, and computer-readable media for detecting the presence of malicious computer code in a computer. In a method embodiment, persistence points in an operating system of the computer are examined (31). When a pointer to a temporary directory is found (32) at a persistence point, a declaration is made (34) of a suspicion of malicious code being present in the computer. Second and third method embodiments are used when the computer has a native operating system (14) controlling hardware (11) functions and a user-interface operating system (12) built on top of the native operating system (14). A fourth method embodiment is used when the computer has an operating system comprising a kernel (20) and a user interface (21).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 3:
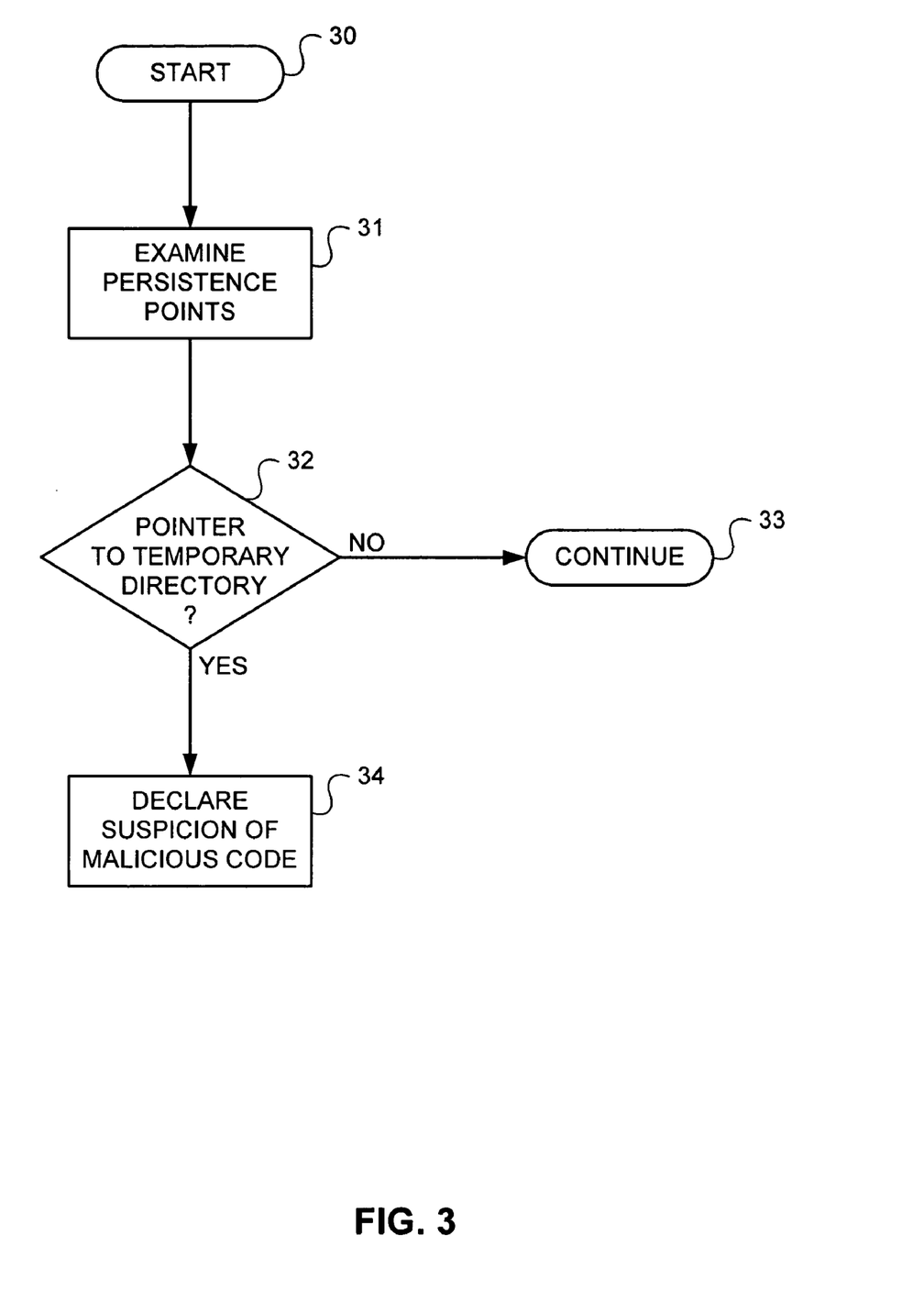
FIG. 3 is a flow diagram illustrating a first method embodiment of the present invention.

A first method embodiment of the present invention is illustrated in FIG. 3. The method starts at step 30. At step 31, persistence points associated with the computer's operating system are examined by an inventive module. The inventive module can be implemented in any combination of hardware, firmware, and software. When implemented in software, the inventive module may reside on any computer-readable medium, such as a hard disk, floppy disk, CD, DVD, etc.

While the invention will be described in the context of a single inventive module performing the inventive steps, said inventive steps can just as easily be performed by a plurality of inventive modules performing individual inventive steps. For example, with respect to the method embodiment illustrated in FIG. 3, there can be separate examination, detection, and declaration modules that are coupled together.

By "persistence point" is meant an item (file or program) that remains associated with the operating system even when the operating system is rebooted. Thus, persistence points include registry locations, shortcut locations, and initialization files.

At step 32, the inventive module inquires as to whether there exists a pointer from a persistence point to a temporary directory. For example, in Windows operating systems, there is a temporary directory where items are placed for short term use. It is within a hidden directory; usually, the user doesn't even see it. If there is no pointer from the persistence point to a temporary directory, control is passed back to normal functions of the computer at continuation step 33. If, on the other hand, there is a pointer from a persistence point to a temporary directory, the inventive module declares a suspicion of malicious code being present in the computer, at step 34.

The theory behind this first method embodiment is that persisting out of a temporary directory is unusual, and therefore inherently suspicious. Spyware/adware has a need to persist, but a temporary directory is normally used for items that do not persist.

Figure 1:
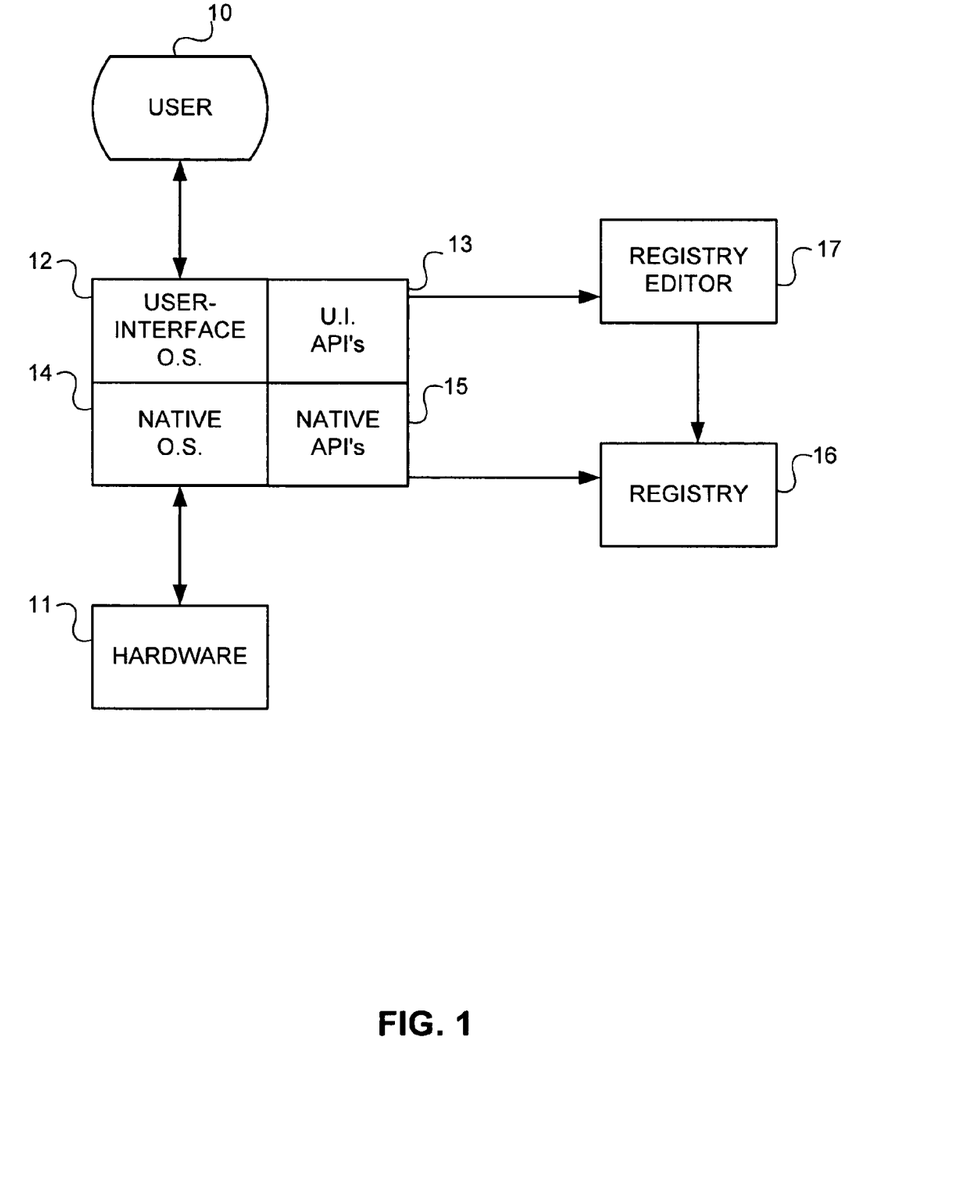
FIG. 1 is a block diagram showing apparatus suitable for use in the second and third method embodiments of the present invention.

A computer architecture usable with the second and third method embodiments is illustrated in FIG. 1. A native operating system 14 controls hardware 11 of the computer. A user-interface operating system 12 is built on top of the native operating system 14, and is used by the human user 10 to control the functioning of the computer. A set of APIs (Application Programming Interfaces) 13 is associated with user-interface operating system 12. Similarly, a set of APIs 15 is associated with native operating system 14. The user-interface APIs 13 are different than the native APIs 15. APIs 13 can, for example, be used to construct a registry editor 17, which edits values of registry 16. An example of this architecture is a Windows32 operating system 12 built on top of a WindowsNT operating system 14.

Other examples of this architecture are the Windows 95 operating system 12 being built on top of a DOS operating system 14, DOS 12 being built on top of the Windows98 operating system 14, and Unix 12 being built on top of the WindowsNT operating system 14. This architecture is a fairly standard technique used to aid porting.

Figure 4:
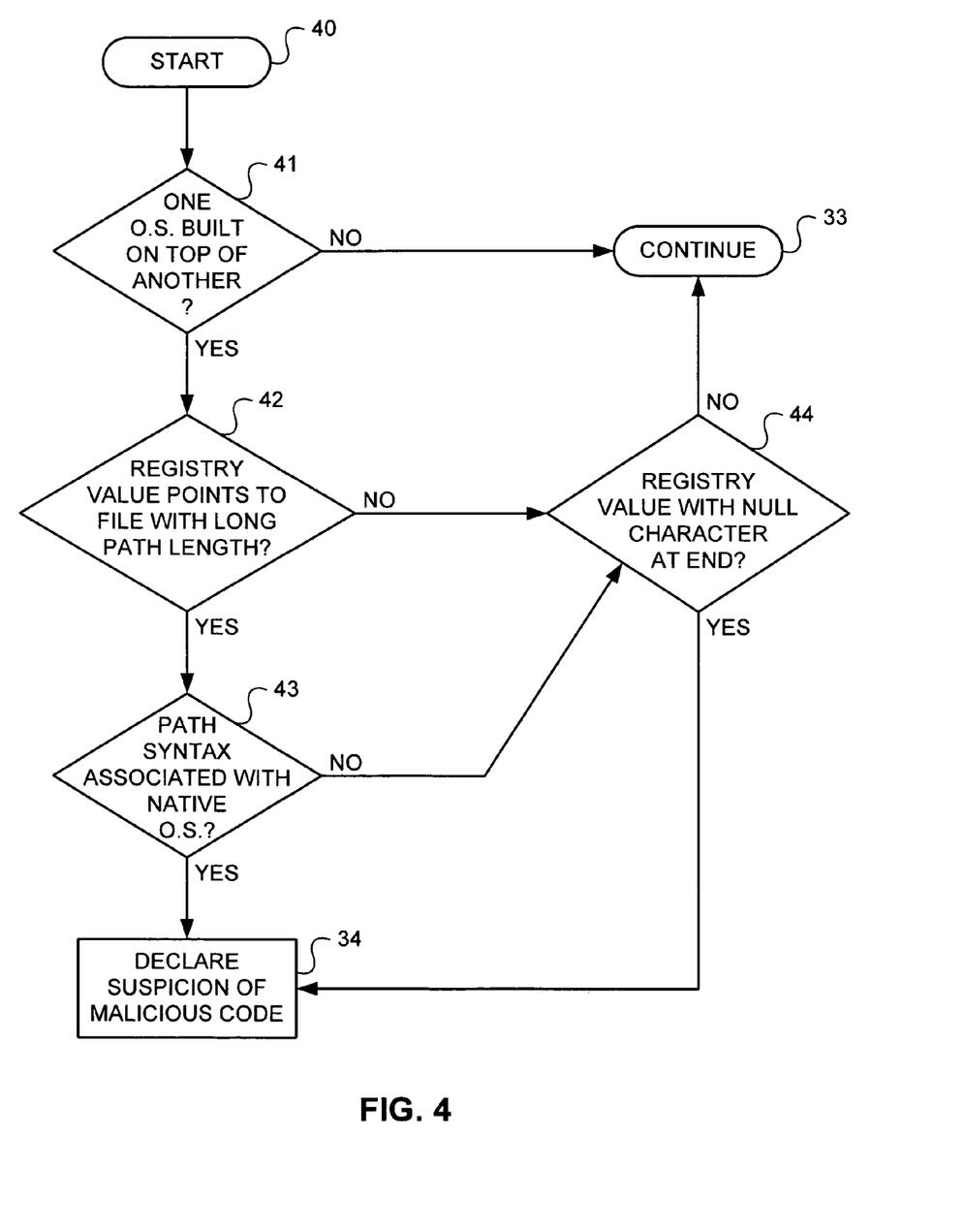
FIG. 4 is a flow diagram illustrating second and third method embodiments of the present invention.

Said second and third method embodiments are illustrated in FIG. 4. The method starts at step 40. At optional step 41, the inventive module verifies that the architecture of the computer being examined is one in which a user-interface operating system 12 is built on top of a native operating system 14, as illustrated in FIG. 1. If not, control is passed to normal functions of the computer at step 33. If this architecture is present, step 42 is performed, at which the inventive module inquires as to whether a registry 16 value points to a file with a path length greater than the maximum path length allowed by the user-interface operating system 12. For example, in Windows32, the maximum path length is 260 bytes, whereas in WindowsNT, the maximum path length is 65,536 bytes. If there is a registry 16 value pointing to a file having a path length greater than the maximum path length allowed by the user-interface operating system 12, step 43 is performed; otherwise, step 44 (associated with the third method embodiment) is performed.

At step 43, the inventive module inquires as to whether the file identified in step 42 uses a path syntax associated with the native operating system 14. For example, this could be the UNC syntax in the case where the native operating system 14 is WindowsNT. A UNC designation for a file starts with "\\". If step 43 determines that the file identified in step 42 uses a path syntax associated with the native operating system 14, the inventive module declares at step 34 (as previously described in conjunction with FIG. 3) a suspicion of malicious code being present in the computer.

Thus ends the description of the second method embodiment. It will be noted that two conditions must be satisfied in said second embodiment for a declaration of a suspicion of malicious code to be made, namely: 1) a registry value points to a file having a path length greater than the maximum path length allowed by the user-interface operating system 12, and 2) said file has a path syntax associated with the native operating system 14. The theory behind the second embodiment is that the spyware/adware author has used a path length and a syntax associated with the native operating system 14 in order to disguise the file from the purview of the user-interface operating system 12. For example, the registry editor 17 is normally written using the user-interface APIs 13, and thus wouldn't normally be able to detect or delete the unconventional file hidden in registry 16 by the spyware/adware author. Yet, this file can nevertheless be executed by the user-interface operating system 12.

The third method embodiment is illustrated in step 44, where the inventive module inquires as to whether there is a registry 16 value having a null character as the last character of the value. If so, step 34 is performed, at which the inventive module declares a suspicion of malicious code being present in the computer. If not, normal functions of the computer are resumed at step 33 as before.

As used herein, "value" includes a registry key, because a registry key is in essence a value of values.

The theory behind the third method embodiment is that the top operating system 12 uses registry 16 values that terminate in the null character, whereas the bottom operating system 14 does not. For example, Windows32 uses registry 16 values that terminate in the null character, while WindowsNT uses a length-based nomenclature. This enables the spyware/adware author to hide his code. For example, in the WindowsNT operating system 14, the spyware/adware author might write a registry 16 value as 4FOOØ, where Ø is the null character. The beginning numeral "4" gives the number of bytes in the value. The Windows32 operating system 12 translates this value to F00ØØ, because there has to be a Ø at the end of the value. This enables the Windows32 operating system 12 to read the value. However, said operating system 12 cannot write to or delete the value, because when it translates back down to WindowsNT terminology, it translates the value into 3FOO, not the original 4FOOØ. This makes the value non-deletable.

As an optional condition to be satisfied before step 34 is entered, the inventive module can inquire as to whether the registry 16 value having a null character as the last character of the value is associated with a persistence point. If so, it is an even stronger indication that malicious code is present in the computer.

FIG. 4 shows the second and third method embodiments on the same flow diagram. However, they can be performed separately and independently of each other. Also, note that FIG. 4 shows the second method embodiment being performed before the third method embodiment. Alternatively, the third method embodiment can just as easily be performed before the second method embodiment.

When a declaration is made at step 34 of a suspicion of malicious code being present in the computer for either of the first, second, or third method embodiments, the inventive module can perform at least one of the three following steps:

block the suspected malicious code from executing;

monitor the location where the suspected malicious code is present (this can yield information concerning who inserted the code there, for example, by examining the date); and perform additional investigative techniques on the suspected malicious code, e.g., subject it to an anti-virus, anti-worm, or anti-spyware/adware scan.

Figure 2:
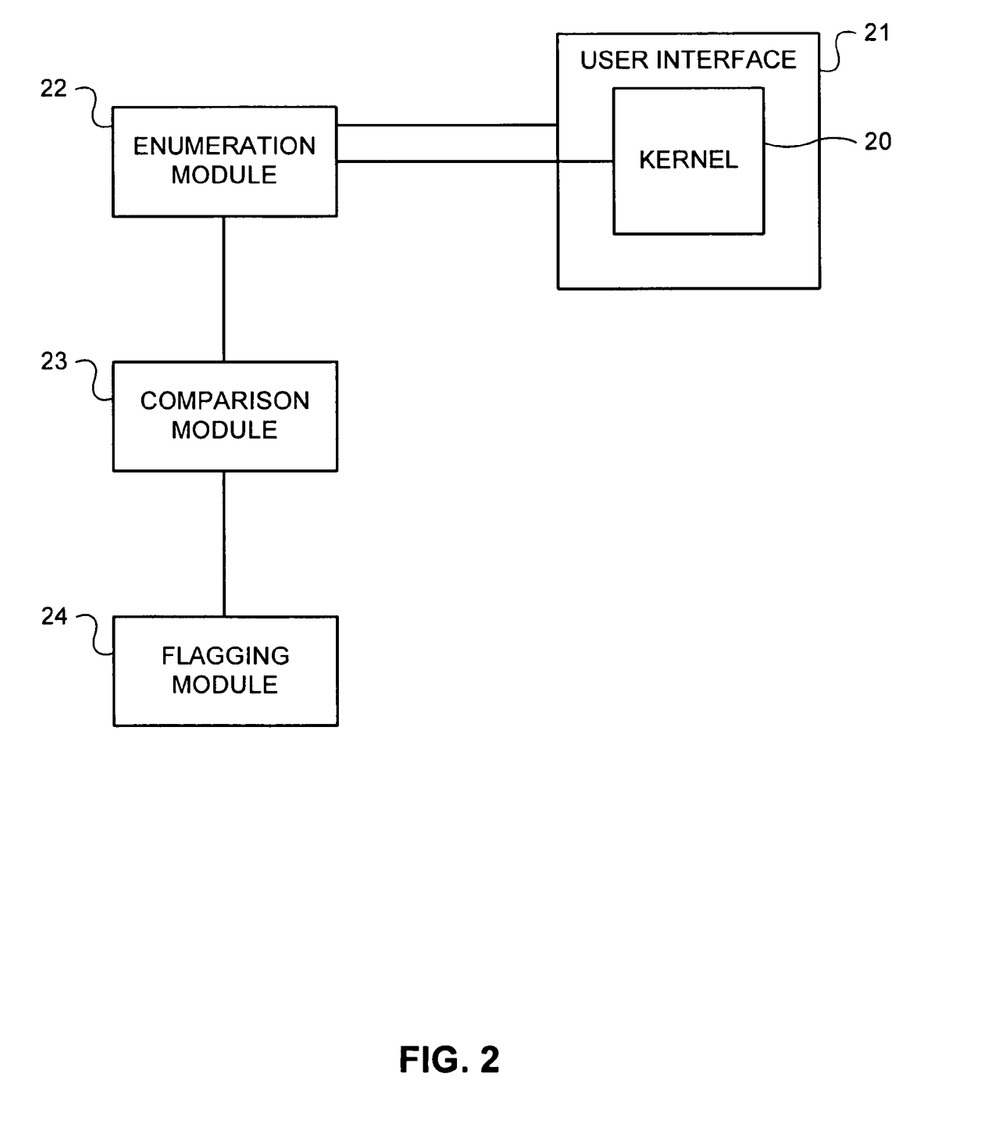
FIG. 2 is a block diagram showing apparatus suitable for use in the fourth method embodiment of the present invention.

A fourth method embodiment of the present invention is used when the architecture follows that illustrated in FIG. 2. In FIG. 2, the operating system has a kernel 20 surrounded by a user interface 21. This architecture is used by all Windows operating systems from Windows95 on, and all versions of UNIX, LINUX, and Solaris, but not, for example, DOS or Windows3.0 or Windows3.1.

Figure 5:
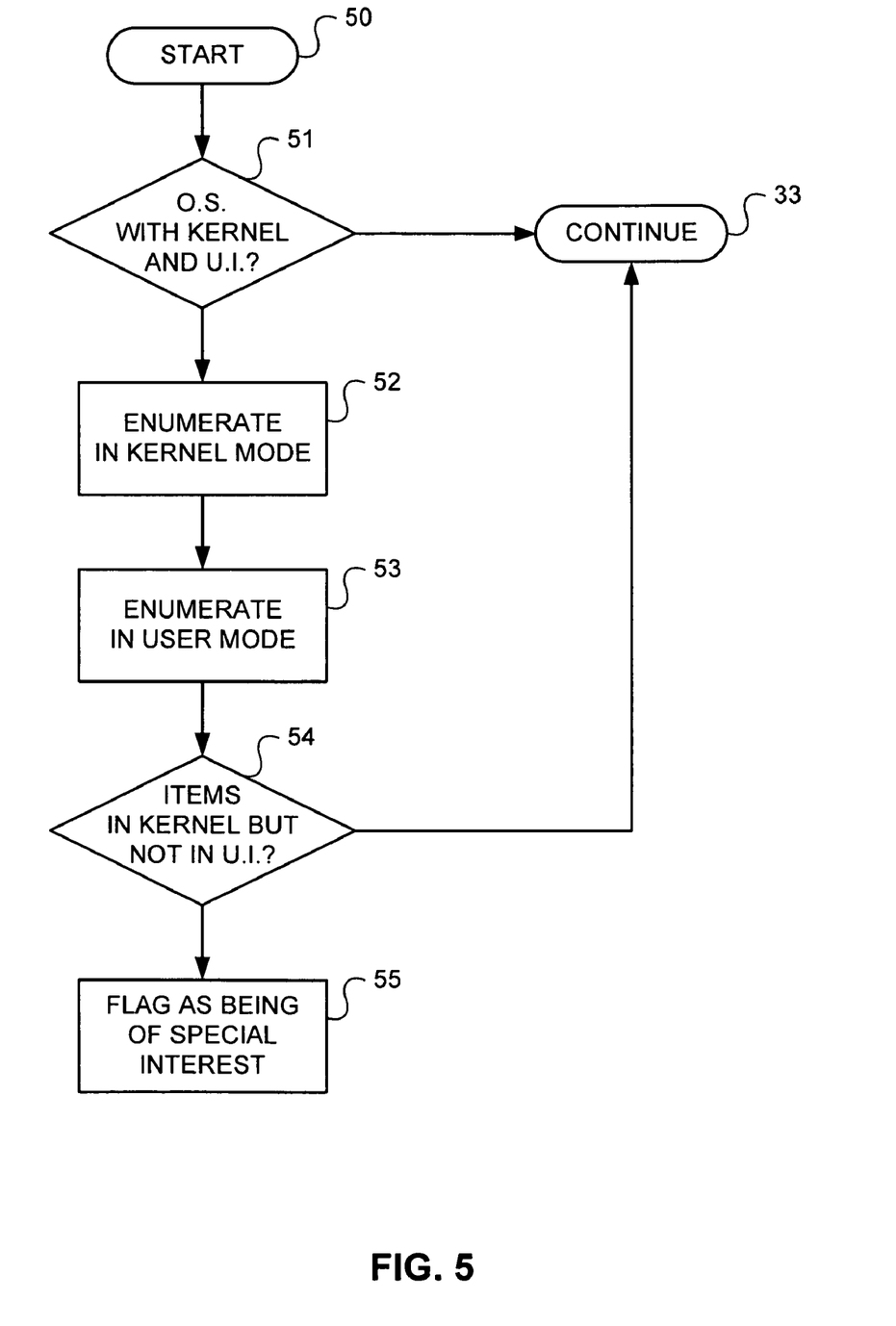
FIG. 5 is a flow diagram illustrating a fourth method embodiment of the present invention.

The fifth method embodiment of the present invention is illustrated in FIG. 5, and begins at step 50. At optional step 51, the inventive module inquires as to whether the operating system is of the type illustrated in FIG. 2. If not, control is passed to the continuation module 33 as before.

If the operating system is of the type illustrated in FIG. 2, step 52 is performed, wherein an enumeration module 22 portion of the inventive module performs an enumeration operation in kernel mode. This produces a list of all the items present in kernel 20. Then, at step 53, enumeration module 22 performs an enumeration operation in user mode. This produces a list of all the items present in user interface 21. At step 54, comparison module 23 portion of the inventive module determines whether there are items that are present in kernel 20 that are not present in user interface 21. If not, control is passed to continuation module 33 as before. If, on the other hand, there are items that are present in kernel 20 that are not present in user interface 21, these items are flagged at step 55 by flagging module 24 portion of the inventive module as being of special interest. At this time these, items can be investigated further to see whether in fact they comprise spyware/adware. It would be imprudent to delete these items without further investigation, because they could comprise security software, which is typically placed inside kernel 20. Thus, deleting such items would produce false positives.

The theory behind the fifth method embodiment is that if a piece of spyware/adware is stealthed, it will appear in the kernel 20 but not in the user interface 21.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for detecting the presence of malicious computer code in a computer, said method comprising the steps of:

examining persistence points associated with an operating system of the computer, persistence points being items that remain associated with the operating system when the operating system is rebooted;

determining whether a pointer from a persistence point to a temporary directory is present in the computer; and when a pointer to a temporary directory from a persistence point is found, declaring a suspicion of malicious code being present in the computer.

2. The method of claim 1 wherein a persistence point is a location from the group of locations consisting of:
registry locations;
short-cut locations; and
initialization files.

3. A method for detecting the presence of malicious computer code in a computer, said method comprising the steps of:

verifying that the computer has a native operating system for controlling hardware functions of the computer and a different user-interface operating system built on top of the native operating system, wherein the native operating system comprises native application program interfaces (APIs), and wherein the user-interface operating system comprises different user-interface APIs;

scanning for a registry value pointing to a file having a path length greater than a maximum path length allowed by the user-interface APIs of the user-interface operating system and the file using a path syntax associated with the native APIs of the native operating system; and responsive to detecting a registry value pointing to a file, the file having a path length greater than a maximum path length allowed by the user-interface APIs of the user-interface operating system and the file using a path syntax associated with the native APIs of the native operating system, declaring a suspicion of malicious code being present in the computer.

4. The method of claim 3 wherein the native operating system is WindowsNT, the user-interface operating system is Windows32, and the path syntax for the native operating system is UNC.

5. A method for detecting the presence of malicious computer code in a computer, said method comprising the steps of:

verifying that the computer has a native operating system for controlling hardware functions of the computer and a different user-interface operating system built on top of the native operating system, wherein the native operating system comprises native application program interfaces (APIs) that do not expect registry values terminating in null characters, and wherein the user-interface operating system comprises different user-interface APIs that expect registry values terminating in null characters;

scanning for a registry value having a null character as the last character of the value; and when a registry value having a null character as the last character of the value is detected, declaring a suspicion of malicious code being present in the computer.

6. The method of claim 5 wherein the registry value having a null character as the last character of the value is associated with a persistence point, the persistence point being an item that remains associated with the native operating system when the native operating system is rebooted.

7. The method of any one of claim 1, 3, or 5 wherein, following the step of declaring a suspicion of malicious code being present in the computer, at least one of the following steps is performed:

blocking the suspected malicious code from executing;
monitoring a location where the suspected malicious code is present; and
subjecting the suspected malicious code to further investigation.

8. A computer-readable non-transitory storage medium containing computer program instructions executable on a processor for detecting the presence of malicious computer code in a computer, said computer program instructions performing steps comprising:

examining persistence points associated with an operating system of the computer, persistence points being items that remain associated with the operating system when the operating system is rebooted;

determining whether a pointer from a persistence point to a temporary directory is present in the computer; and when a pointer to a temporary directory from a persistence point is found, declaring a suspicion of malicious code being present in the computer.

9. The computer-readable non-transitory storage medium of claim 8 wherein a persistence point is a location from the group of locations consisting of:
registry locations;
short-cut locations; and
initialization files.

10. A computer-readable non-transitory storage medium containing computer program instructions executable on a processor for detecting the presence of malicious computer code in a computer, said computer program instructions performing steps comprising:

verifying that the computer has a native operating system for controlling hardware functions of the computer and a different user-interface operating system built on top of the native operating system, wherein the native operating system comprises native application program interfaces (APIs), and wherein the user-interface operating system comprises different user-interface APIs;

scanning for a registry value pointing to a file having a path length greater than a maximum path length allowed by the user-interface APIs of the user-interface operating system and the file using a path syntax associated with the native APIs of the native operating system; and responsive to detecting a registry value pointing to a file, the file having a path length greater than a maximum path length allowed by the user-interface APIs of the user-interface operating system and the file using a path syntax associated with the native APIs of the native operating system, declaring a suspicion of malicious code being present in the computer.

11. The computer-readable non-transitory storage medium of claim 10 wherein the native operating system is WindowsNT, the user-interface operating system is Windows32, and the path syntax for the native operating system is UNC.

12. A computer-readable non-transitory storage medium containing computer program instructions executable on a processor for detecting the presence of malicious computer code in a computer, said computer program instructions performing steps comprising:

verifying that the computer has a native operating system for controlling hardware functions of the computer and a different user-interface operating system built on top of the native operating system, wherein the native operating system comprises native application program interfaces (APIs) that do not expect registry values terminating in null characters, and wherein the user-interface operating system comprises different user-interface APIs that expect registry values terminating in null characters;

scanning for a registry value having a null character as the last character of the value; and when a registry value having a null character as the last character of the value is detected, declaring a suspicion of malicious code being present in the computer.

13. The computer-readable non-transitory storage medium of claim 12 wherein the registry value having a null character as the last character of the value is associated with a persistence point, the persistence point being an item that remains associated with the native operating system when the native operating system is rebooted.

14. The computer-readable non-transitory storage medium of any one of claim 8, 10, or 12 wherein, following the step of declaring a suspicion of malicious code being present in the computer, at least one of the following steps is performed:

blocking the suspected malicious code from executing;

monitoring a location where the suspected malicious code is present; and subjecting the suspected malicious code to further investigation.

15. Apparatus for detecting the presence of malicious computer code in a computer, said apparatus comprising:

means for examining persistence points associated with an operating system of the computer, persistence points being items that remain associated with the operating system when the operating system is rebooted;

coupled to the examining means, means for detecting a pointer from a persistence point to a temporary directory; and coupled to the detecting means, means for declaring a suspicion of malicious code being present in the computer when the detecting means finds a pointer to a temporary directory from a persistence point.

16. Apparatus for detecting the presence of malicious computer code in a computer, said apparatus comprising:

a module for verifying that the computer has a native operating system for controlling hardware functions of the computer and a different user-interface operating system built on top of the native operating system, wherein the native operating system comprises native application program interfaces (APIs), and wherein the user-interface operating system comprises different user-interface APIs;

an investigation module for scanning for a registry value pointing to a file having a path length greater than a maximum path length allowed by the user-interface APIs of the user-interface operating system and the file using a path syntax associated with the native APIs of the native operating system; and coupled to the investigation module, a declaration module for declaring a suspicion of malicious code being present in the computer responsive to the investigation module detecting a registry value pointing to a file, the file having a path length greater than a maximum path length allowed by the user-interface APIs of the user-interface operating system and the file using a path syntax associated with the native APIs of the native operating system.

17. Apparatus for detecting the presence of malicious computer code in a computer, said apparatus comprising:

a module for verifying that the computer has a native operating system for controlling hardware functions of the computer and a different user-interface operating system built on top of the native operating system, wherein the native operating system comprises native application program interfaces (APIs) that do not expect registry values terminating in null characters, and wherein the user-interface operating system comprises different user-interface APIs that expect registry values terminating in null characters;

a detection module for scanning for a registry value having a null character as the last character of the value; and coupled to the detection module, a declaration module for declaring a suspicion of malicious code being present in the computer when the detection module detects a registry value having a null character as the last character of the value.

* * * * *